UNITED STATES PATENT OFFICE.

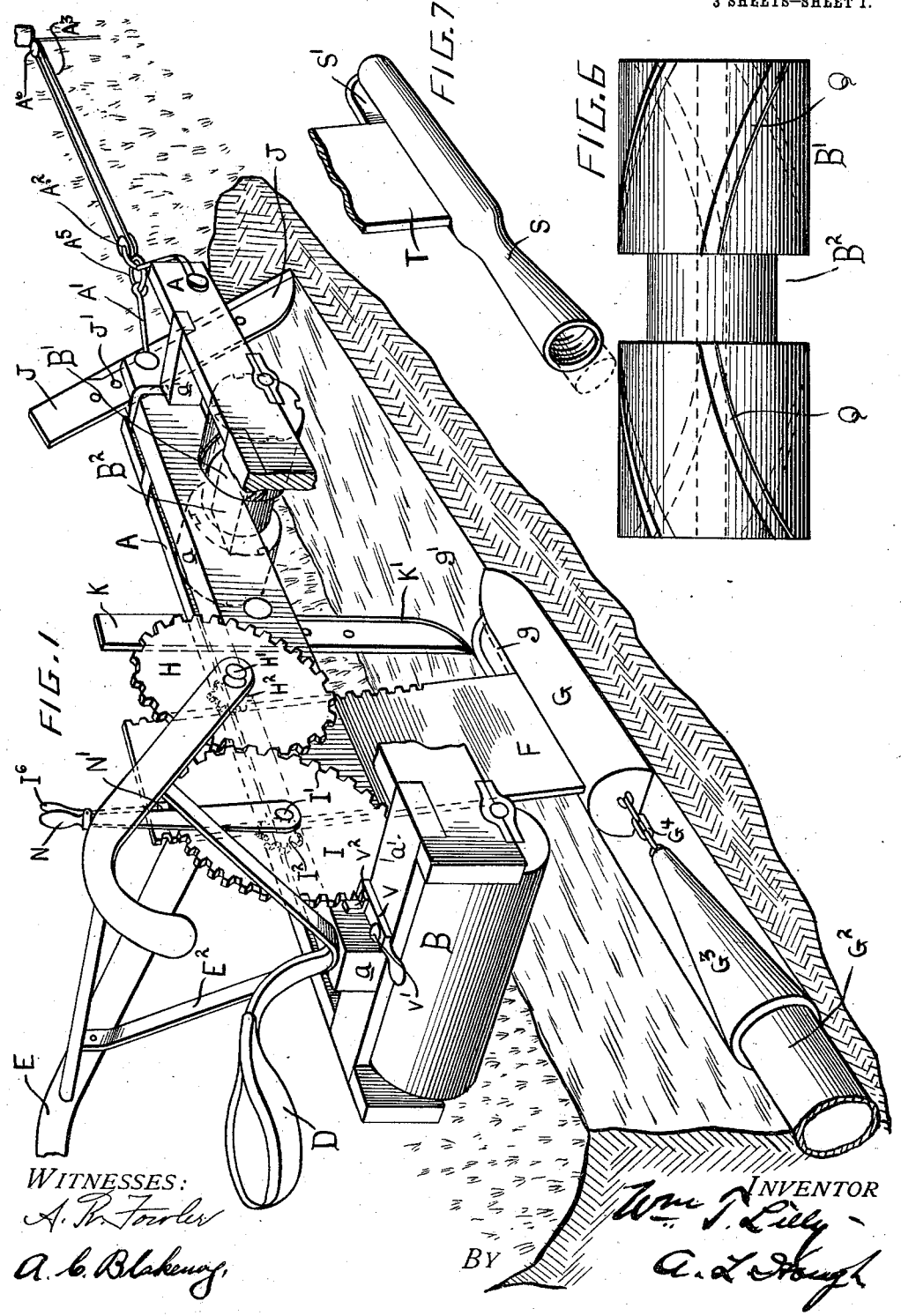

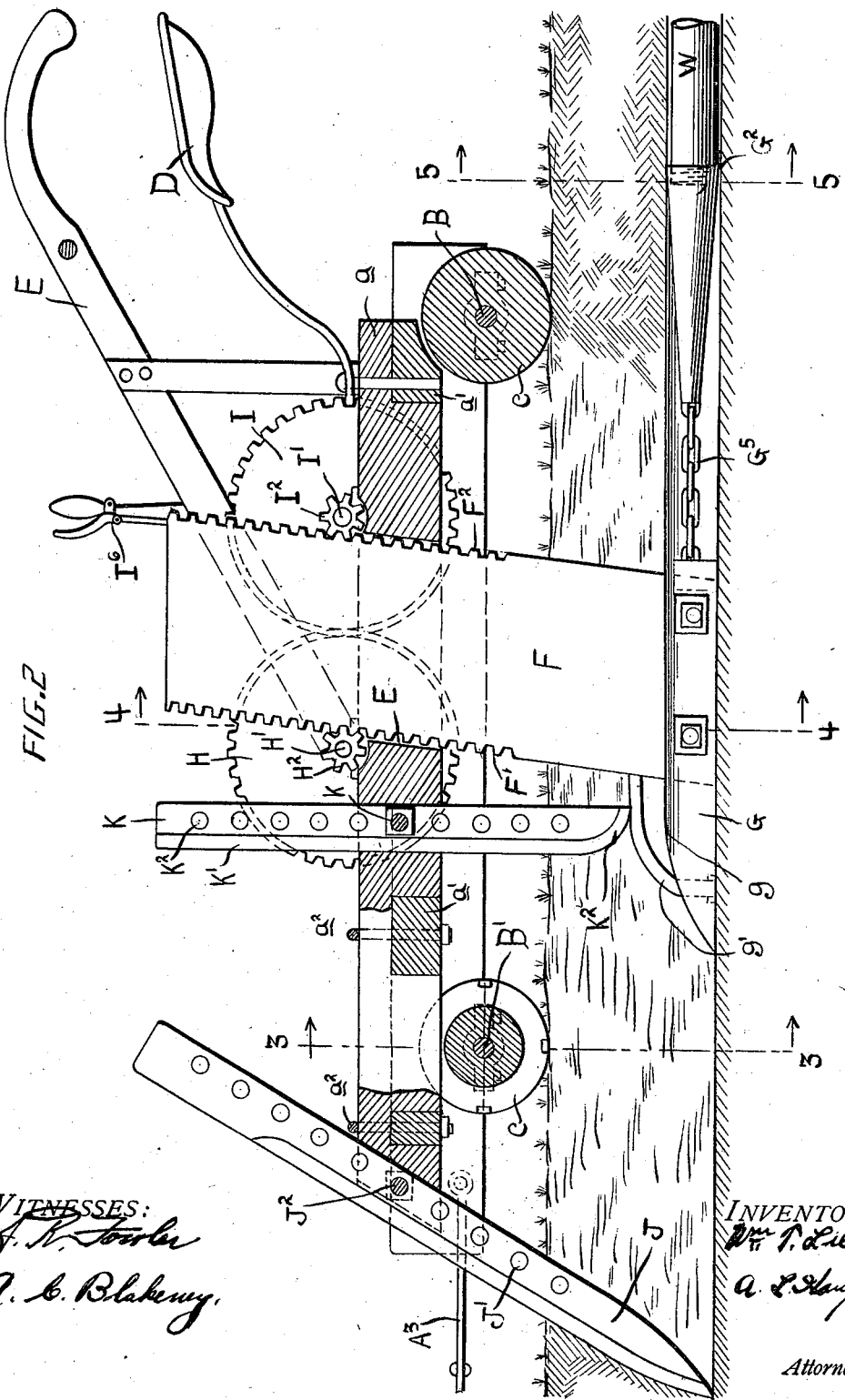

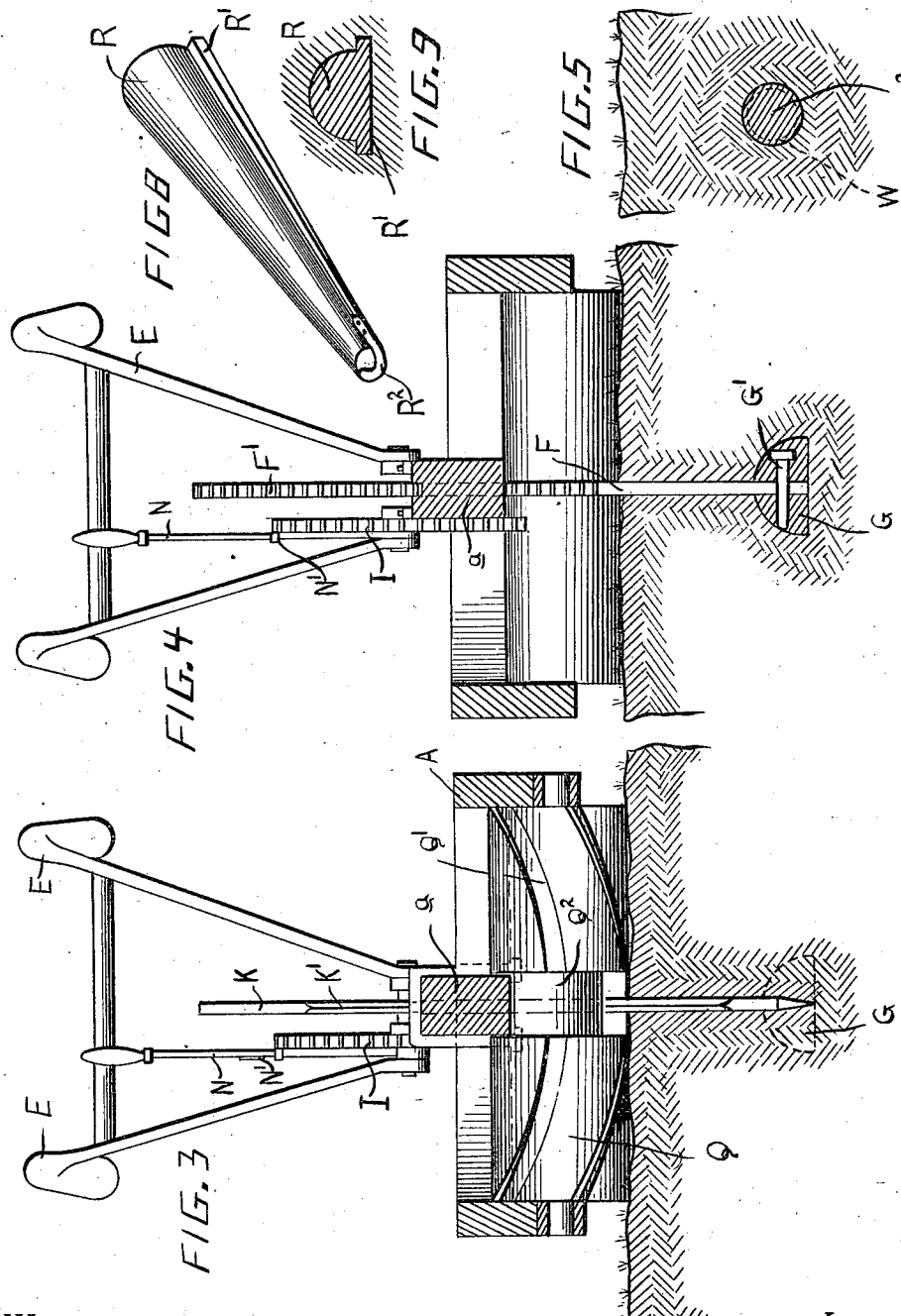

WILLIAM T. LILLY, OF BECKLEY, WEST VIRGINIA.

DITCHING, PIPE-LAYING, AND IRRIGATING APPARATUS.

996,866.   Specification of Letters Patent.   Patented July 4, 1911.

Application filed November 22, 1910. Serial No. 593,711.

*To all whom it may concern:*

Be it known that I, WILLIAM T. LILLY, a citizen of the United States, residing at Beckley, in the county of Raleigh and State of West Virginia, have invented certain new and useful Improvements in Ditching, Pipe-Laying, and Irrigating Apparatus; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in ditching, pipe laying and irrigating apparatus and the object in view is to produce a simple and efficient device of this nature and comprises various details of construction and combinations and arrangements of parts which will be hereinafter fully described and then specifically defined in the appended claims.

I illustrate my invention in the accompanying drawings, in which:—

Figure 1 is a perspective view showing the application of my invention. Fig. 2 is a vertical longitudinal sectional view through the apparatus. Fig. 3 is a cross sectional view taken on line 3—3 of Fig. 2 and looking in the direction of the arrow. Fig. 4 is a vertical sectional view on line 4—4 of Fig. 2 looking in the direction of the arrow. Fig. 5 is a sectional view through a pipe laid by the apparatus underneath the surface of the ground. Fig. 6 is a detail in elevation of one of the rollers with a circumferential recess. Fig. 7 is a detail perspective view of a slight modification of a feature of the invention. Fig. 8 is a detail view of a modified form of attachment, and Fig. 9 is a sectional view through the modified form shown in Fig. 8.

Reference now being had to the details of the drawings by letter, A designates the frame of the apparatus which may be of any suitable shape, preferably rectangular outlined, and mounted at the rear end of the frame in suitable bearings is a roller B, while a second roller, designated by letter B', is journaled near the forward portion of the frame and in suitable bearings. Said forward roller B' has a central annular recessed or contracted portion $B^2$, shown clearly in the detail view (Fig. 6) of the drawings, as well as in Figs. 1 and 3, and fitted to the cross-pieces $a'$, forming a portion of the frame, is a removable beam $a$ which, when adjusted in place upon the truck having the rollers as before described, is adapted to be held in place by means of keepers $a^2$, shown clearly in Fig. 2 of the drawings. To the forward end of the frame are pivotally connected the rods A', fastened to a ring $A^5$ which in turn is connected to a pulley $A^2$ about which a rope or cable $A^3$ passes and which passes about another pulley $A^6$ and is adapted to be fastened to any projection whereby a powerful leverage may be obtained to draw the apparatus through the ground.

Fitted to the forward end of the bar $a$ is a colter J having a series of apertures J' therein for the reception of an adjusting pin $J^2$, shown clearly in Fig. 2 of the drawings, forming means whereby the colter may be held at different elevations. The rear edge of the colter is held in contact with an inclined portion of the frame and its forward longitudinal edge, which is sharpened, is adapted to produce a draw cut through the soil to open ground for the passage of the bit or shoe which will be presently described. Said beam $a$ has a seat D fastened thereto and also handles E held rigidly by the braces $E^2$.

Journaled upon the stub shafts I' and H', which are mounted in suitable bearings upon the beam $a$, are the two intermeshing gear wheels I and H respectively, and fixed to the shaft H' is a pinion $H^2$ which is in mesh with the gear teeth F' formed on one edge of the vertically adjustable member F, which latter is adapted to have a movement through on opening E formed in the beam $a$, as shown clearly in Fig. 2 of the drawings. The opposite edge of said member F is provided with rack teeth $F^2$ which are in mesh with the teeth of the pinion wheel $I^2$ keyed to the shaft I'. An operating lever, designated by letter N, is pivotally mounted upon the shaft I', and has a pawl N', adapted to engage the teeth of the wheel I and said pawl is regulated by means of a hand lever $I^6$. In order to hold said wheels in adjusted positions, I provide a lever V pivotally mounted upon a pin V' and guided by an angled member $V^2$, said lever V being adapted to swing into one of the teeth of the wheel I, as shown clearly in Fig. 1 of the drawings.

Fastened to the lower end of the member

F is a bit or shoe G, having its lower surface flat and its forward end tapering, as shown clearly in the drawings, and said bit or shoe has a longitudinal vertical slot for the reception of a cutting blade $g$, the edge of which is sharpened as at $g'$ and convexed. A colter K is adjustably mounted upon a pin $k'$ carried by the beam $a$ and is adapted to be held in one or another of the perforations $k^2$. The edge K' of the colter K is sharpened and its lower end $K^2$ curved as shown and is in contact with the upper sharpened edge of the cutting blade $g$. A trailing bit, designated by letter $G^2$, is of general conical shape and is connected by means of the chain $G^4$ with the bit or shoe G and a pipe W, preferably of threaded circumference, is fitted to the interiorly threaded end of the bit $G^2$.

In Fig. 7 of the drawings, I have shown a slight modification of the bit or shoe in which the two members shown in Fig. 1, designated by letters G and $G^3$, are combined in one, forming the member S which is connected to the vertically adjustable bar T held in a slot in one end of said member S, while a tube or pipe, as shown by dotted lines, is adapted to be held in the hollow end of the member.

Upon reference to Fig. 8 of the drawings will be seen a member, designated by letter R, which is a substitute form of trailer of general conical shape and provided with laterally projecting ribs R', said modified form of trailer R being adapted for use when it is not desired to utilize the apparatus for drawing a pipe through a channel formed by the apparatus but which may be utilized for forming a hole in the ground, the laterally projecting ribs serving to form openings in the ground which will be prevented from filling in the event of the main portion caving in for any purpose, it being well understood that, when an underground opening is formed in the ground for the passage of water and when water is once made to pass through it, it will serve as a drainage means.

In operation, the parts being assembled as shown in Fig. 2 and the apparatus is moved over the surface of the ground, the colter J will cut a slot in the ground in which the bit is guided as it is drawn forward, the colter K and cutting blade G further serving to open the furrow thus cut and allowing the pointed bit to be drawn forward and with it the trailing bit to which the pipe to be laid is connected. As the apparatus passes over the ground and the bit is drawn forward and the pipe laid, the rear roller B will serve to securely pack down the ground about the pipe and securely hold the same in place and prevent any caving in as a considerable amount of pressure comes upon the rear roller.

When the attachment shown in Fig. 8 is utilized, it is connected to the bit and merely drawn through the ground, leaving a hole with laterally projecting portions and forming an aperture with the earth above packed down securely, the lateral projection serving as a means for the passage of water in the end of the main portion of the hole formed by the device caving in for any reason.

By the provision of the beam $a$ being made adjustable, it will be noted that said beam with the attachments may be removed from the main truck and utilized independent of the same as may be desired. By the manipulation of the hand-operated lever, the depth at which it may be desired to have the bit drawn forward through the soil may be regulated at the will of the operator.

What I claim to be new is:—

1. A ditching, pipe laying and irrigating apparatus, comprising a frame, a colter and rollers mounted thereon, a tapering bit, a vertically disposed member upon which the same is mounted and provided with gear teeth upon its opposite edges, intermeshing gear wheels journaled upon the frame, pinions actuated by said wheels and meshing with the teeth upon the opposite edges of said member, a lever for operating one of said wheels, a trailing bit secured to the bit upon said member, and a pipe adapted to be fastened to said trailing bit.

2. A ditching, pipe laying and irrigating apparatus, comprising a frame, rollers journaled upon said frame, one of which has a central circumferential recess, a detachable beam fastened to said frame, colters fastened to said beam, a bit, an upright member fastened thereto, means for raising and lowering the bit, and mechanism for holding the latter in an adjusted position.

3. A ditching, pipe laying and irrigating apparatus, comprising a frame, rollers journaled upon said frame, a detachable beam mounted upon said frame, colters and stub shafts mounted upon said beam, intermeshing gear wheels fastened to said stub shafts, pinions fixed to the latter, a bit having an upright shank portion with teeth upon its opposite edges in mesh with the teeth of said pinions, and means for rotating one of the gear members.

In testimony whereof I hereunto affix my signature in the presence of two witnesses.

WILLIAM T. LILLY.

Witnesses:
 A. L. HOUGH,
 A. R. FOWLER.